United States Patent [19]

Narhi et al.

[11] Patent Number: 4,988,890
[45] Date of Patent: Jan. 29, 1991

[54] SIGNAL TRANSMISSION AND RECEIVING SYSTEM WITH LOOPED TRANSMISSION LINE

[75] Inventors: Larry Narhi, Bolton; Thomas Pitman, Sterling, both of Mass.

[73] Assignee: Digital Equipment Corp., Maynard, Mass.

[21] Appl. No.: 368,786

[22] Filed: Jun. 20, 1989

[51] Int. Cl.⁵ ............................................. H01R 9/07
[52] U.S. Cl. .................................. 307/147; 333/100; 361/398; 361/428; 439/492; 439/505
[58] Field of Search ................... 307/12, 147; 333/32; 340/825.05; 361/393, 398, 428; 364/708; 439/291, 49, 50, 492; 174/117 F, 103; 445/3, 5; 375/36

[56] References Cited

U.S. PATENT DOCUMENTS

| | | | |
|---|---|---|---|
| 3,727,168 | 4/1973 | Henschen et al. | 361/428 |
| 3,835,252 | 9/1974 | Ananiades et al. | 178/68 |
| 4,038,601 | 7/1977 | Laborie et al. | 325/23 |
| 4,466,687 | 8/1984 | Frantz | 439/492 |
| 4,539,655 | 9/1985 | Trussell et al. | 364/900 |
| 4,556,881 | 12/1985 | Basile | 340/825 |
| 4,592,049 | 5/1986 | Killat et al. | 370/87 |
| 4,622,550 | 11/1986 | O'Connor et al. | 340/825.05 |
| 4,658,375 | 4/1987 | Onogi et al. | 361/393 |
| 4,745,597 | 5/1988 | Morgan | 370/87 |

FOREIGN PATENT DOCUMENTS 2851858  5/1979  Fed. Rep. of Germany ...... 361/398

Primary Examiner—A. D. Pellinen
Assistant Examiner—Peter Ganjoo
Attorney, Agent, or Firm—Nutter, McClennen & Fish

[57] ABSTRACT

A signal transmission and receiving system includes a controller or central processor unit and one or more peripheral units interconnected by a transmission line or bus having a plurality of conductors. Instead of providing terminator devices for the opposite ends of the bus in the controller and in the last peripheral unit connected to the bus, respectively, both terminator devices are located in the controller and the bus is looped back on itself so that both ends of the bus can be connected to a connector having two sets of contacts, one set being connected electrically to the conductors at one end of the bus and the other set of contacts being connected electrically to the conductos at the other end of the bus. That connector is arranged to be coupled to a mating connector on the controller, that mating connector also having two sets of contacts, one set being connected electrically to one terminator device in the controller and the other set being connected electrically to a second terminator device in the controller so that when the two connectors are coupled together, both ends of the bus have the proper terminating impedances. Additional connectors spaced along the bus are arranged to be coupled to the peripheral units.

12 Claims, 1 Drawing Sheet

SIGNAL TRANSMISSION AND RECEIVING SYSTEM WITH LOOPED TRANSMISSION LINE

This invention relates to a signal or data transmission and receiving system. It relates more particularly to apparatus for communicating between a plurality of signal or data transmission and/or receiving units over a transmission line or bus.

BACKGROUND OF THE INVENTION

Many present day electronic systems include a number of different subsystems or units which communicate with each other over a transmission line or bus. For example, in a data processing system, a plurality of peripheral units such as disk and tape drives, keyboards, etc. may communicate with each other and with a controller or central processor (CPU) over such a transmission line or bus. Similarly, in data storage subsystems, a bus may connect a plurality of disk drives to a single disk controller. FIG. 1 shows a prior system of this general type that includes a controller or CPU 10 and a plurality of peripheral units 12a, 12b, ... 12n interconnected by a transmission line or bus 14. In a typical arrangement, the bus has many, e.g. 50, separate conductors 15. Connectors 16 and 18 mounted to the bus proximal and distal ends 14a and 14b, respectively, incorporate pins or contacts 16a, 18a that are connected electrically to the conductors 15 of the bus. That is, a bus having fifty conductors 15 ordinarily has 50-pin end connectors. The connector 16 at the bus proximal end 14a is arranged to be coupled to a mating connector 22 in the CPU or controller 10; the connector 18 at the other end 14b of the bus is arranged to be mated to a connector 22 of a peripheral unit such as a disk drive. Additional connectors 20 are spaced along the bus with their pins or contacts 20a similarly connected to the conductors 15 of the bus 14 for linking additional peripheral units to the bus 14. If the transmission line or bus 14 is a flat flexible circuit or ribbon, these intermediate connectors 20 are often of the pass-through type so that they are spaced parallel to one another in line with the bus 14 as shown in FIG. 1.

The controller or processor unit 10 and each of the peripheral units 12a to 12n includes a connector 22 which mates with the appropriate connector on the bus 14 and which has contacts that connect to the usual interface section 24 in the units 10 and 12a to 12n. Each such section 24 contains a driver and receiver so that the transmission line system is bidirectional along its entire length in that signals can be applied to the transmission line or bus by any one of the units 10, and 12a to 12n and can be received by any one or more of those units, the operation of the various units being synchronized by pulses from a clock in the CPU or controller 10.

In a system of this type, it is essential that the transmission line or bus 14 be terminated in the characteristic impedance of the transmission line. In other words, the conductors at the bus proximal end 14a connected to the CPU 10 are connected by way of connectors 16 and 22 to a terminator device 26 in the CPU 10. This terminator device 26 is simply a set of impedances connected between the ends of the bus conductors 15 and a source of d.c. potential in the CPU 10; see U.S. Pat. No. 3,835,252, for example. The bus distal end 14b is likewise terminated by a similar terminator device 28. Invariably, that device 28 is incorporated into the peripheral unit 12n connected to the connector 18 at the distal end 14b of the bus. In other words, the bus is terminated by device 28 through the mating connectors 18 and 22.

It will be apparent from the foregoing, then, that in the prior systems, typified by the one depicted in FIG. 1, the last peripheral unit 12n is different from all of the other peripheral units of the same type in the system in that it includes the terminating device 28. In other words, if a particular system has two or more peripheral units of the same type (e.g. a disk drive), which is usually the case, this means that one of the units is different from the others in that it incorporates a terminator device 28 that the other similar units do not have. The implications of this are great. It means that two versions of the disk drive or other peripheral unit must be stocked by both manufacturing and field surface personnel, one version with a terminator device 28 installed, and another version without the terminator device. Since conceivably any type of peripheral unit (e.g. disk drive, tape drive, keyboard, etc.) may constitute the last peripheral unit on a given bus, two versions of all peripheral units must be maintained in inventory. Resultantly, high inventory costs are associated with the prior systems.

The providing of a terminator device in the last peripheral unit of the prior signal transmission and receiving systems of this general type also means that the manufacturing and field technicians have to keep track of which peripheral unit is on the end of the bus, which increases to some extent the time that it takes to assemble the system.

SUMMARY OF THE INVENTION

Accordingly, this invention aims to provide a signal transmission and receiving system employing a transmission line or bus whose peripheral units do not require terminator devices. This allows the peripheral units to be positioned interchangeably along the transmission line or bus.

Further, since all peripheral units of a given type can be identical, fewer peripheral units have to be maintained in inventory and they can be assembled to the transmission line or bus in a minimum amount of time by manufacturing and field service personnel and therefore at minimum cost to the manufacturer and/or customer.

The invention, which is particularly applicable to an SCSI bus, accordingly comprises the features of construction, combination of elements and arrangement of parts which will be exemplified in the following detailed description, and the scope of the invention will be indicated in the claims.

Briefly, instead of providing a terminator device for the distal end of the bus in the last peripheral unit connected to the bus, a second terminator device is provided in the CPU or controller that is connected to the proximal end of the bus and the bus is looped back on itself so that the distal end of the bus can be connected to that second terminator device in the controller or CPU. In other words, both ends of the transmission line or bus are terminated at the controller. To allow for this, the two mating connectors at the controller have two corresponding sets of pins or contacts. Corresponding first sets of contacts in the mating connectors connect the transmission line conductors at the beginning or proximal end of the transmission line to the interface device in the controller and to one terminator device therein. Corresponding second sets of contacts in those connectors connect the conductors at the other end of the transmission line to the second terminator device in the controller. Since both ends of the transmission line or bus are terminated right at the controller, none of the peripheral units connected to the transmission line or bus needs to incorporate a terminator device. Therefore, all of the peripheral units of a given type (e.g. tape drive), can be identical and are, therefore, interchangeable on the transmission line or bus. This means that only one version of a given type of peripheral unit has to be maintained in inventory. Moreover, technical personnel do not have to keep track of which peripheral unit is coupled to the end of the transmission line or bus, thereby minimizing the time that it takes to build or assemble a given system of this general type.

BRIEF DESCRIPTION OF THE DRAWING

For a fuller understanding of the invention, reference should be had to the following detailed description, taken in connection with the accompanying drawing, in which.

DESCRIPTION OF THE PREFERRED EMBODIMENT

Figure 2:
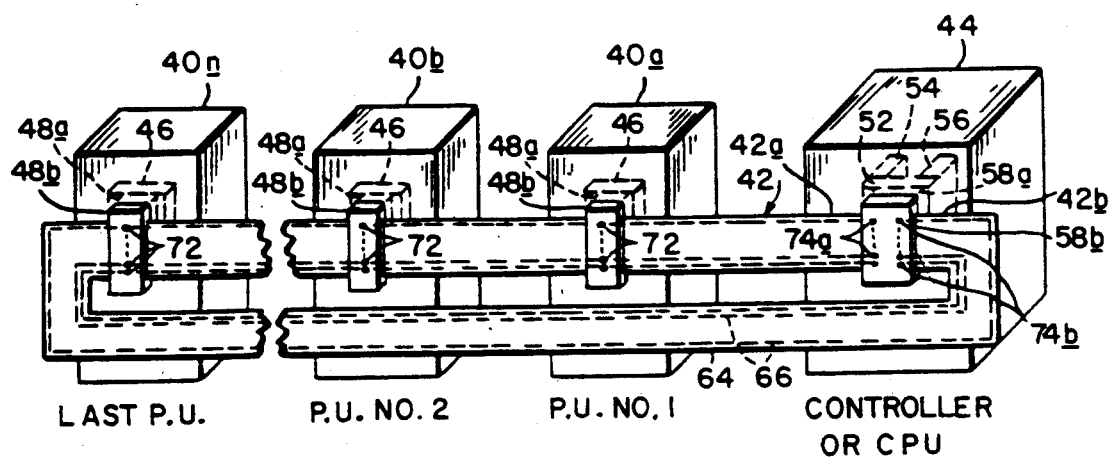
FIG. 2, is a signal transmission and receiving system incorporating our invention.

Referring to FIG. 2 of the drawing, we will describe the invention as implemented in a data storage system. This system includes a plurality of disk drives $40a$, $40b$ ... $40n$ connected by way of a bidirectional transmission line or bus 42 to a disk controller 44. The disk drives $40a$ to $40n$ are all identical and each includes the usual interface section 46 and a connector $48a$ adapted to be coupled to a mating connector $48b$ on the transmission line or bus 42.

Figure 1:
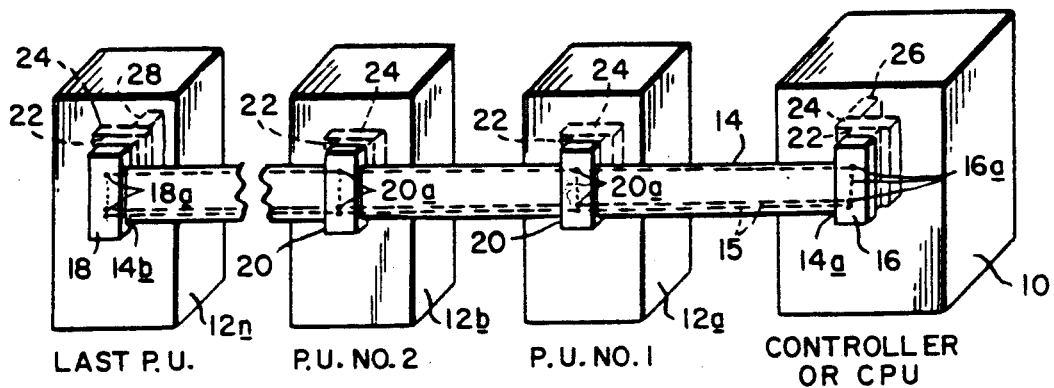
FIG. 1, already described, is a block diagram of a signal transmission and receiving system according to the prior art.

The controller 44 is of more or less conventional design in that it includes the usual interface device 52 and a terminator device 54 for terminating a proximal end $42a$ of the transmission line or bus 42. It differs from the prior controllers, typified by the one depicted in FIG. 1, in that it includes a second terminator device 56 for terminating a distal end $42b$ of the transmission line or bus 42. Connections to the interface unit 52 and to the terminator devices 54 and 56 from without the controller 44 are made by way of a connector $58a$ mounted to the controller 44. A mating connector $58b$ mounted to the transmission line or bus 42 is coupled to the connector $58a$ to connect the transmission line or bus 42 to the controller 44.

Still referring to FIG. 2, the illustrated transmission line or bus 42 is in the form of a flexible circuit or ribbon 64 containing a multiplicity, e.g. fifty, separate conductors 66. Instead of having the proximal end $42a$ of the transmission line 42 connected to controller 44 and the distal end $42b$ of the bus connected to the last peripheral unit $40n$ on the bus, as in the prior art, the transmission line or bus 42 turns back on itself to form a loop and both ends $42a$, $42b$ of the transmission line or bus are connected to the connector $58b$ which is coupled to the connector $58a$ on the controller 44.

The other connectors $48b$ coupled to the various peripheral units $40a$ to $40n$ are spaced along the transmission line or bus 42 in the usual way. These are preferably of the pass-through type so that the transmission line or bus 42 extends from opposite sides of the connectors as shown in FIG. 2. Preferably also, the connectors $48b$ are all located on the same leg of the bus loop as shown. This allows the other legs to be narrower because the conductors 66 can be packed closer together than the connector pins 72, $74a$ and $74b$. Thus the illustrated bus 42 has a pair of relatively short parallel legs and a pair of relatively long parallel legs with the one of those long legs carrying the connectors $48b$ and $58b$ being somewhat wider than the other three legs.

Each of the connectors $48b$ includes a set of contacts or pins 72 that are connected electrically to the different bus conductors 66. Thus, ordinarily, if the transmission line or bus 42 has fifty conductors 66, each connector $48b$ would have fifty pins or contacts 72, each one being connected electrically to a different one of the conductors 66. When a connector $48b$ is coupled to a mating connector $48a$ of a peripheral unit $40a$ to $40n$, the pins or contacts 72 plug into or contact a corresponding set of sockets or contacts (not shown) in the mating connector $48a$ to effect electrical connections between the transmission line conductors 66 and the interface section 46 of the particular peripheral unit $40a$ to $40n$.

The connector $58b$ at the ends $42a$, $42b$ of the bus is somewhat different from the connectors $48b$ that attach to the various peripheral units $40a$ to $40n$ in that it has twice as many pins or contacts as those connectors $48b$. Furthermore, the contacts or pins are arranged in two sets. One set of contacts $74a$ is connected electrically to the proximal ends of the transmission line conductors 66. The other set of contacts $74b$ is connected electrically to the opposite or distal ends of those conductors 76. In other words, for the fifty conductor transmission line or bus 42 illustrated in FIG. 2, there are fifty pins $74a$ and fifty pins $74b$, with the corresponding pins in the two sets being connected to opposite ends of the same transmission line or bus conductor 66.

The mating connector $58a$ on the controller 44 likewise has two sets of sockets (not shown) which are contacted by the pins or contacts $74a$ and $74b$ when the connector $58b$ is coupled to connector $58a$. Thus when ,the connectors $58a$ and $58b$ are coupled together, the pins those are connected electrically to the interface unit 52 so that signals can be applied to and be received from the proximal end $42a$ of the transmission line or bus 42. The set of pins $48a$ of the connector $58b$ are also connected electrically to the terminator device 54 so that the proximal end $42a$ of the transmission line or bus 42 has the proper terminating impedances for the conductors 66. The set of pins $74b$ of the connector $58b$, on the other hand, is connected electrically to the terminator device 56 in controller 44 so that the distal end $42b$ of the transmission line or bus 42 is likewise terminated by the proper impedances for conductors 66.

Since both ends of the transmission line 42 are terminated by terminator devices 54 and 56 in controller 44, the last peripheral unit $40n$ coupled to the transmission line does not have to include a terminator device. Rather, that unit can be identical to all the other peripheral units of the same type connected to the transmission line 42. In other words, if all the peripheral units $40a$ to $40n$ are disk drives, all of those disk drives can be identical and can be positioned interchargeably along the transmission line or bus 42. Thus, manufacturing and field service personnel are not required to keep track of which peripheral unit is coupled to the end $48b$ of the transmission line or bus 42. Moreover, different versions of the same peripheral unit, e.g. a disk drive with a terminator device and one without, do not have to be stocked or maintained in inventory. Accordingly, the present invention results in an overall reduction in the cost of signal transmission and receiving systems of this general type.

The invention as particular applicability to a Small Computer System Interface (SCSI) bus of the type associated with small computers and has indeed been advantageously applied to such a bus.

Certain changes may be made in the above construction without departing from the scope of the invention. For example, instead of arranging the two sets of contacts 74a and 74b in connector 58b (and the corresponding contacts in the connector 58a) in two parallel sets, the contacts 74a, 74b can be arranged in a single line one over the other, or in any other suitable configuration. Also, instead of forming each connector 58a, 58b as a unit, the two sets of pins 74a and 74b may be placed in two separate housings. Therefore, it is intended that all matter contained in the above description and shown in the accompanying drawing be interpreted as illustrative and not in a limiting sense.

It is also to be understood that the following claims are intended to cover all of the generic and specific features of the invention herein described.

What is claimed is:

1. Signal transmission and receiving apparatus comprising
    a transmission line including a plurality of insulated conductors;
    connector means, said connector means including two sets of contact elements;
    means for electrically connecting contact elements of one set to said conductors at one end of the transmission line;
    means for connecting the contact elements of the other set to said conductors at the opposite end of the transmission line; and
    one or more additional connector means mounted to the transmission line intermediate the ends thereof, each of said additional connector means including a set of contact elements selectively connected electrically to said conductors.

2. The apparatus defined in claim 1 wherein a plurality of said one or more additional connector means are spaced along said transmission line.

3. The apparatus defined in claim 1 wherein said transmission line is a flexible ribbon.

4. The apparatus defined in claim 3 wherein said one or more additional connector means are of the pass-through type.

5. The apparatus defined in claim 1 wherein said transmission line is formed as a loop with a pair of relatively long parallel legs and a pair of relatively short parallel legs, and said connector means and said one or more additional connector means are mounted to the same one of the relatively long loop legs.

6. The apparatus defined in claim 5 wherein said same one of the relatively long loop legs is wider than the other loop legs.

7. The apparatus defined in claim 1 wherein the two sets of contact elements in the connector means are arranged in parallel rows.

8. Signal transmission and receiving apparatus comprising
    a SCSI bus having a plurality of spaced-apart electrically insulated conductors, said transmission line being formed as a looped ribbon with a pair of relatively long generally parallel legs and a pair of relatively short generally parallel legs;
    a first connector having two sets of contact elements mounted to one of said loop legs;
    means for connecting the contact elements of one set to selected conductors at one end of the bus
    means for connecting the contact elements of the other set to selected conductors at the other end of the bus;
    a plurality of pass-through type connectors mounted to said one of said loop legs at spaced-apart locations therealong, each of said additional connectors including a set of contact elements selectively connected electrically to said conductors.

9. The apparatus defined in claim 8 wherein said one of said loop legs is wider than the other loop legs.

10. The apparatus defined in claim 9 wherein the two sets of contacts in the first connector are arranged in parallel rows.

11. The apparatus defined in claim 10 wherein the contact elements in the plurality of pass-through connectors are arranged in rows which are parallel to the contact rows in the first connector.

12. The apparatus defined in claim 8 and further including
    a controller connected electrically to the contact elements of the first connector, and
    a peripheral unit connected electrically to at least one of the plurality of pass-through connectors.

* * * * *